(12) United States Patent
Foster et al.

(10) Patent No.: US 12,066,097 B2
(45) Date of Patent: Aug. 20, 2024

(54) SHIFTER LEVER

(71) Applicant: Lund, Inc., Buford, GA (US)

(72) Inventors: Josh Foster, Buford, GA (US); Terrel Lindsay, Buford, GA (US)

(73) Assignee: Lund, Inc., Buford, GA (US)

( * ) Notice: Subject to any disclaimer, the term of this patent is extended or adjusted under 35 U.S.C. 154(b) by 0 days.

(21) Appl. No.: 18/097,162

(22) Filed: Jan. 13, 2023

(65) Prior Publication Data
US 2024/0240712 A1 Jul. 18, 2024

(51) Int. Cl.
*F16H 59/02* (2006.01)
*F16H 59/10* (2006.01)

(52) U.S. Cl.
CPC ..... *F16H 59/0208* (2013.01); *F16H 59/0278* (2013.01); *F16H 59/10* (2013.01)

(58) Field of Classification Search
CPC ... F16H 59/0208; F16H 59/10; F16H 59/0278
USPC ...................................... 74/473.29
See application file for complete search history.

(56) References Cited

U.S. PATENT DOCUMENTS

| | | | | |
|---|---|---|---|---|
| 3,693,467 A * | 9/1972 | Oehl | ............... | F16H 59/0278 74/523 |
| 3,990,535 A * | 11/1976 | Bruce | ............... | F16H 59/0208 181/207 |
| 4,492,129 A * | 1/1985 | Hasegawa | ............... | G05G 1/04 403/372 |
| 4,569,246 A * | 2/1986 | Katayama | ............... | F16H 59/0208 403/225 |
| 7,032,474 B2 * | 4/2006 | Tucker | ............... | F16H 59/0208 74/543 |
| 2002/0124675 A1 * | 9/2002 | Hashimoto | ............... | F16H 59/0208 74/473.29 |
| 2003/0131679 A1 * | 7/2003 | Balamucki | ............... | F16H 59/04 74/473.3 |
| 2004/0194568 A1 * | 10/2004 | Ply | ............... | G05G 9/047 74/473.29 |
| 2004/0255710 A1 * | 12/2004 | Tucker | ............... | F16H 59/0208 74/473.29 |
| 2005/0279598 A1 * | 12/2005 | McPherson | ............... | F16F 7/108 188/378 |
| 2009/0072455 A1 * | 3/2009 | McPherson | ............... | F16L 9/21 267/136 |
| 2022/0042593 A1 * | 2/2022 | Grassauer | ............... | B60K 20/04 |

FOREIGN PATENT DOCUMENTS

| | | | | |
|---|---|---|---|---|
| DE | 4025446 A1 | * | 10/1990 | |
| EP | 0148332 A2 | * | 10/1984 | |
| EP | 935084 A2 | * | 8/1999 | ............. B60K 20/02 |
| GB | 2248279 A | * | 4/1992 | ......... F16H 59/0208 |

* cited by examiner

*Primary Examiner* — T. Scott Fix
(74) *Attorney, Agent, or Firm* — William H. Honaker; Dickinson Wright PLLC

(57) ABSTRACT

A shifter lever for a transmission of a motor vehicle includes a shifter tube extending between an upper end and a lower end. The lower end including an attachment member configured to be attached to the vehicle transmission for controlling an operation thereof. The shifter lever also includes a liner of foam rubber material disposed in the shifter tube and along a substantially entire length thereof for reducing vibration in the shifter tube. The liner is injected into the shifter tube and cured in place to conform to an interior surface of the shifter tube and to adhere to the interior surface of the shifter tube.

15 Claims, 5 Drawing Sheets

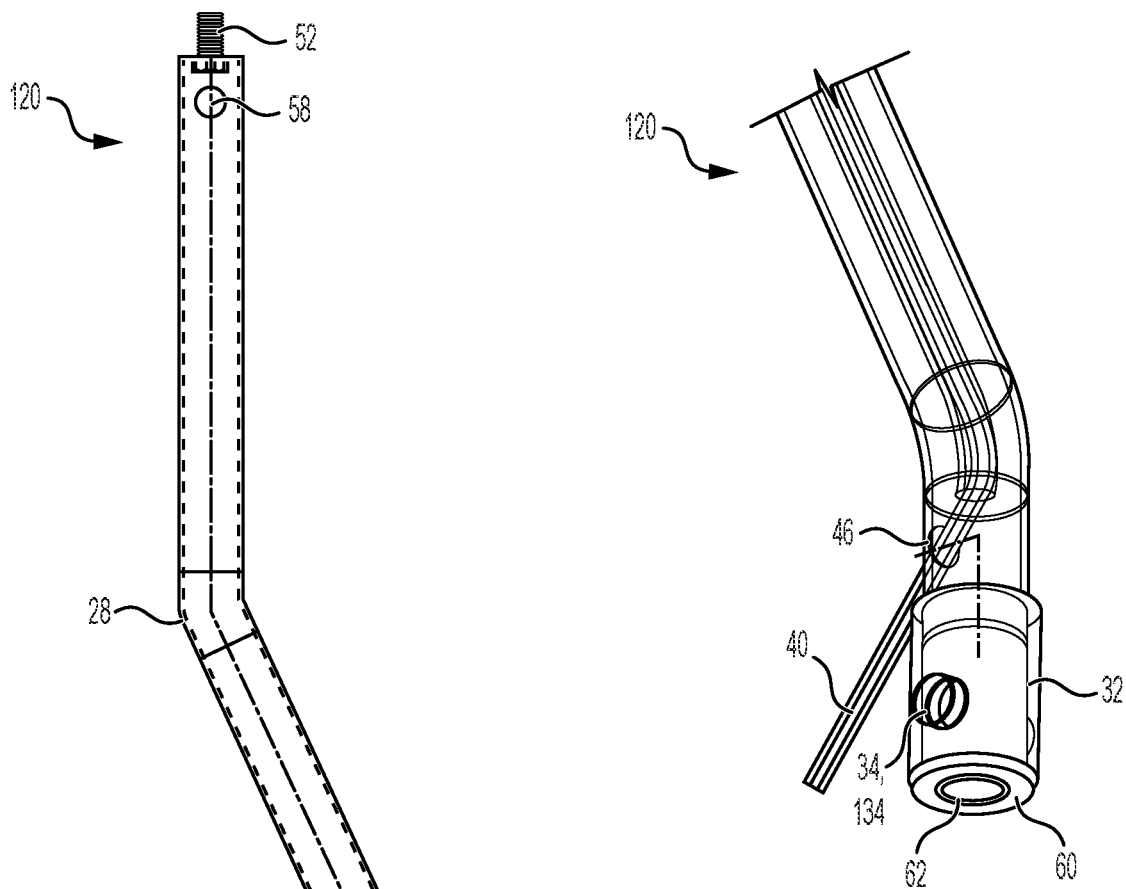
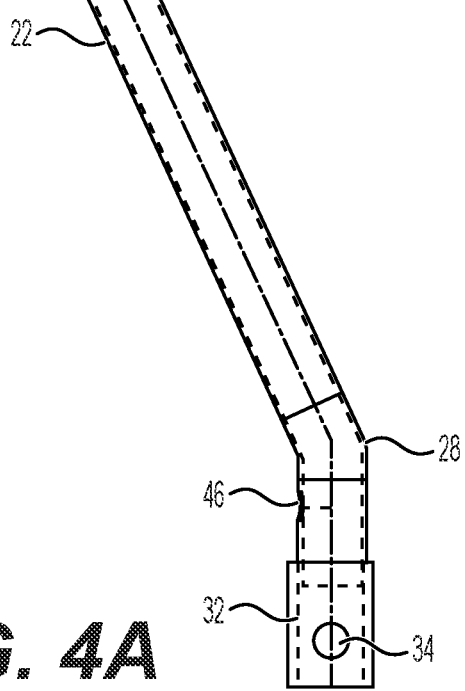
FIG. 4A
FIG. 4B

SHIFTER LEVER

FIELD

The present disclosure relates generally to shifter levers for actuating a manual transmission in a vehicle, such as a truck.

BACKGROUND

Conventional shifter levers for heavy trucks, and particularly large size shifter levers, are typically hollow to save weight. Hollow shifter levers can create an echo chamber that transmits noise from the transmission, and which can cause the shifter lever to seem very loud. Furthermore, conventional hollow shifter levers can transmit a high amount of vibration from the transmission and into a shift knob, where the vibration is felt by an operation.

SUMMARY

The present disclosure provides a shifter lever for a transmission of a motor vehicle. The shifter lever includes a shifter tube extending between an upper end and a lower end. The lower end including an attachment member configured to be attached to the vehicle transmission for controlling an operation thereof. The shifter lever also includes a liner of foam material disposed in the shifter tube and along a substantially entire length thereof for reducing vibration in the shifter tube.

BRIEF DESCRIPTION OF THE DRAWINGS

Further details, features and advantages of designs of the invention result from the following description of embodiment examples in reference to the associated drawings.

FIG. 4A shows a side view of a second shifter lever of the present disclosure;

FIG. 4B shows a partially-transparent perspective view showing a section of the second shifter lever of FIG. 4A around a lower end thereof;

DETAILED DESCRIPTION

Figure 1:
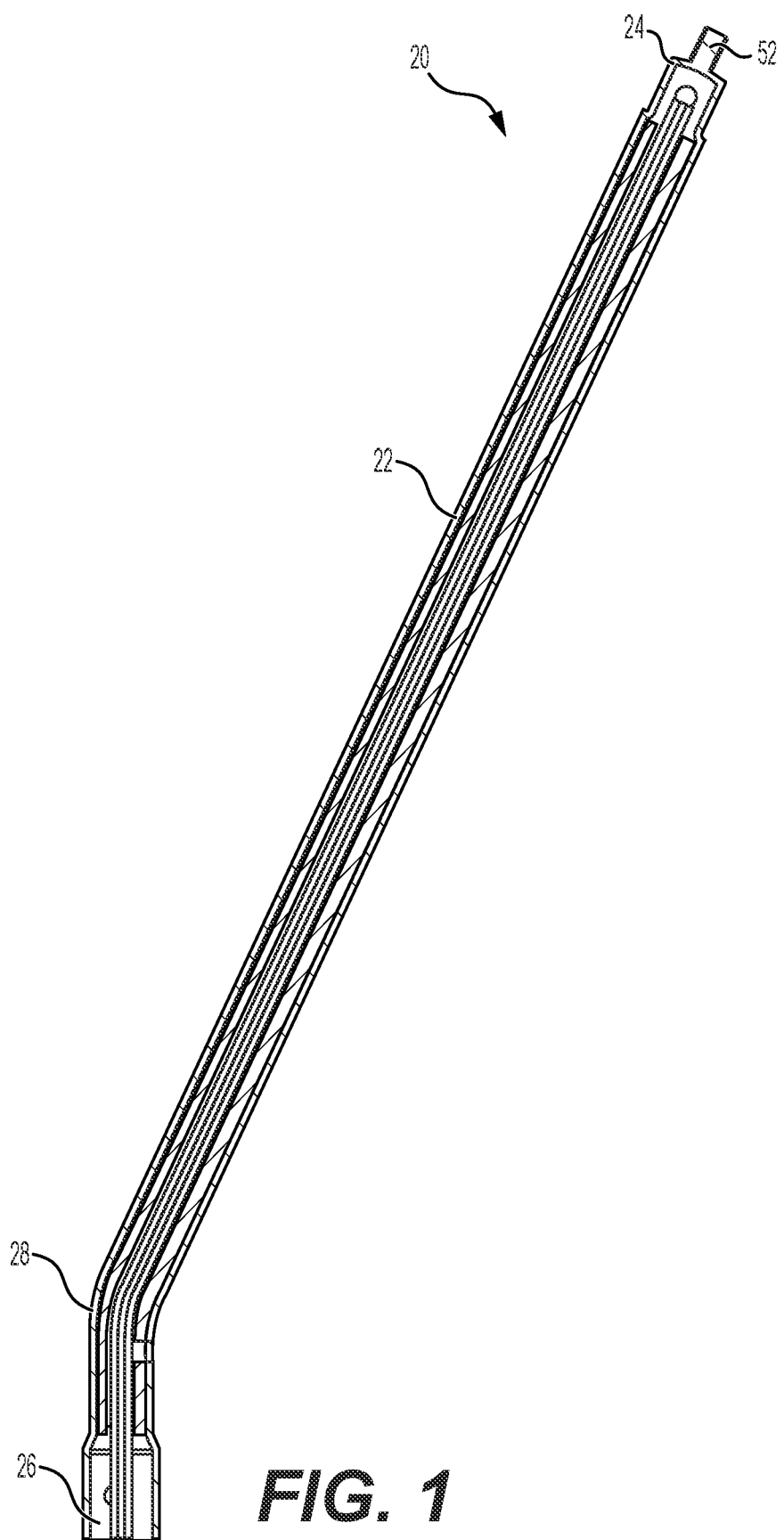
FIG. 1 shows a side cross-sectional view of a first shifter lever of the present disclosure.

Referring to the drawings, the present invention will be described in detail in view of following embodiments.

The present disclosure provides a shifter lever for a transmission of a motor vehicle. Several different variations or embodiments of the shifter lever are provided.

FIG. 1 shows a side cross-sectional view of a first shifter lever 20 including a shifter tube 22 that extends between an upper end 24 and a lower end 26. The shifter tube 22 may have a diameter of about 1.25 inches or 1.5 inches, although it may be larger or smaller. The shifter tube 22 includes a bend 28 located near the lower end 26 and about 10% of the length of the shifter tube 22 therefrom. The bend 28 defines an angle of about 30-degrees. However, the position and the degree of the bend 28 may be different for different applications and/or for user preference. The shifter tube 22 may be made of metal, such as stainless steel, which may have a bright metallic finish. However, the shifter tube 22 may have a different finish, such as a brushed metallic finish or a painted finish.

Figure 2:
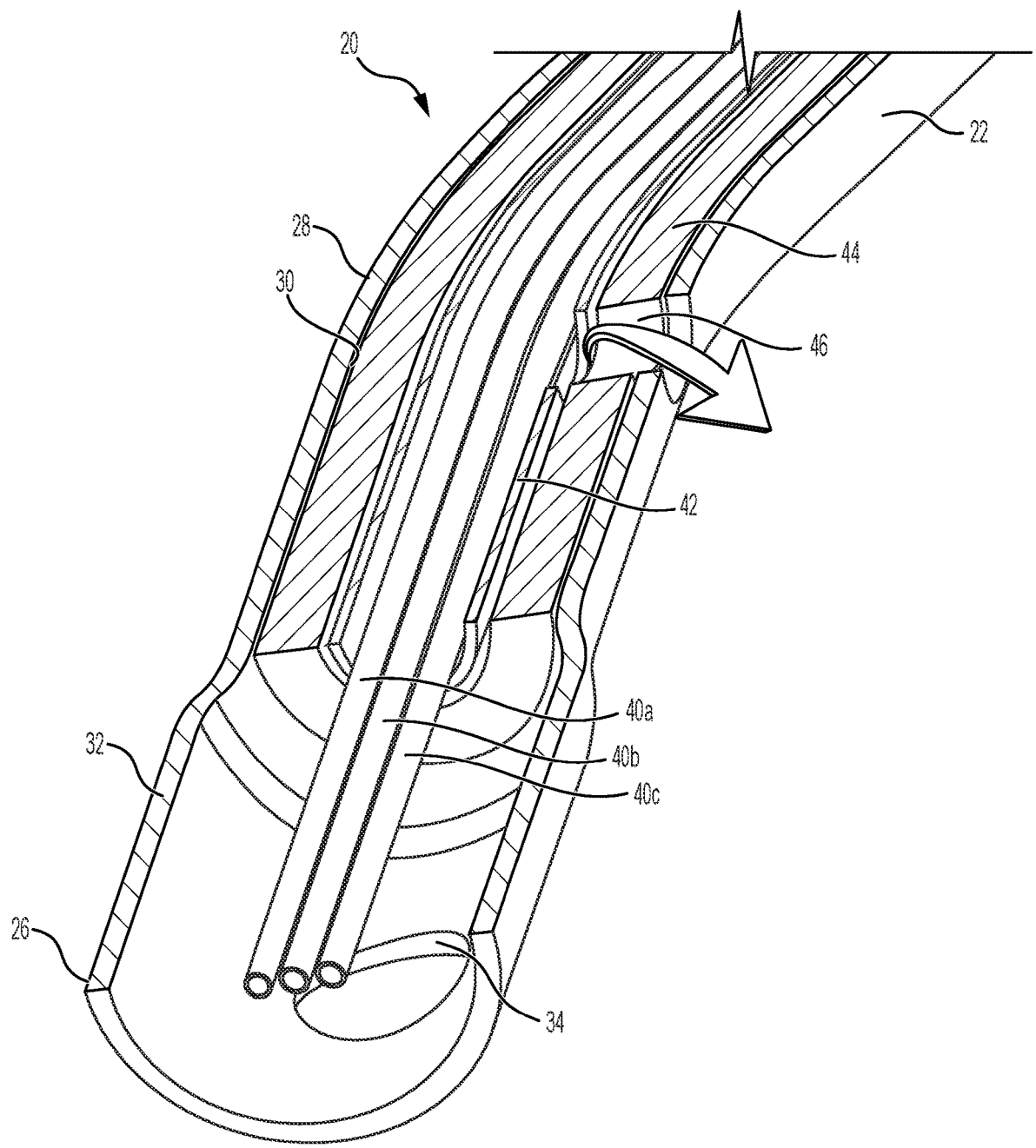
FIG. 2 shows a perspective cut-away view showing a section of the first shifter lever of FIG. 1 around a lower end thereof.

FIG. 2 shows a perspective cut-away view showing a section of the first shifter lever 20. As shown in FIG. 2, the shifter tube 22 has a round cross-sectional shape that defines an interior surface 30 along substantially an entire length thereof. The shifter tube 22 includes a base portion 32 adjacent to the lower end 26, which may receive an attachment member (not shown on FIG. 2) for coupling the first shifter lever 20 to the vehicle transmission. The base portion 32 has a tubular shape with a circular cross-section that is wider than the round cross-section of the main part of the shifter tube 22. The shifter tube 22 defines a mounting hole 34 through a side wall of the base portion 32 for receiving a fastener, such as a pin or a bolt, to attach the shifter tube 22 to the transmission or to another structure, such as a linkage, that is operably connected to the transmission. A plurality of air lines 40a, 40b, 40c extend through the shifter tube 22 and connect to one or more air valves (not shown) for controlling functions related to the operation of the vehicle, such as a high/low gear range setting. Alternatively or additionally, one or more electrical cables may extend through the shifter tube 22 for connection to electrical devices, such as switches and/or indicator lights.

As shown in FIG. 2, an inner conduit tube 42 extends through the shifter tube 22 and along substantially an entire length of the shifter tube 22. The air lines 40a, 40b, 40c extend through the inner conduit tube 42 between a lower portion thereof, at or adjacent to the lower end 26, and an upper portion that is at or adjacent to the upper end 24.

FIG. 2 also shows the first shifter lever 20 including a liner 44 of foam material disposed in the shifter tube 22. The liner 44 may include, for example, a foam rubber material, although other types of foams may be used, such as a polyurethane foam. The liner 44 may extend along a substantially entire length of the shifter tube 22 for reducing vibration therein. The liner 44 may define a channel with one or more air lines and/or electrical cables extending therethrough. FIG. 2 shows the liner 44 extending annularly around the inner conduit tube 42 and holding the inner conduit tube in a central position spaced apart from the interior surface 30 of the shifter tube 22. The liner 44 may, therefore, prevent the inner conduit tube 42 or the air lines 40a, 40b, 40c from contacting the interior surface 30 of the shifter tube 22, which could otherwise generate a rattling noise.

In some embodiments, the liner 44 may be cured in place to conform to the interior surface 30 of the shifter tube 22 and to adhere thereto, thereby preventing any relative motion between the shifter tube 22 and the liner 44. For example, the liner 44 may be formed by a curing reaction from a liquid material that is poured or otherwise injected into the annular space between the inner conduit tube 42 and the interior surface 30 of the shifter tube 22 to form a bond therebetween.

FIG. 2 show the air lines 40a, 40b, 40c extending out of an axial end of the inner conduit tube 42 and into the base portion 32 of the shifter tube 22. Alternatively, the air lines 40a, 40b, 40c may extend out of a side of the shifter tube 22. For example, and as also shown in FIG. 2, the shifter tube 22 and the inner conduit tube 42 may together define a lower aperture 46 adjacent to but spaced art from the base portion 32, and the air lines 40a, 40b, 40c may extend through the inner conduit tube 42 and out of the lower aperture 46. Additionally of alternatively, one or more electrical cables may extend through the inner conduit tube 42 and out of the lower aperture 46.

Figure 3:
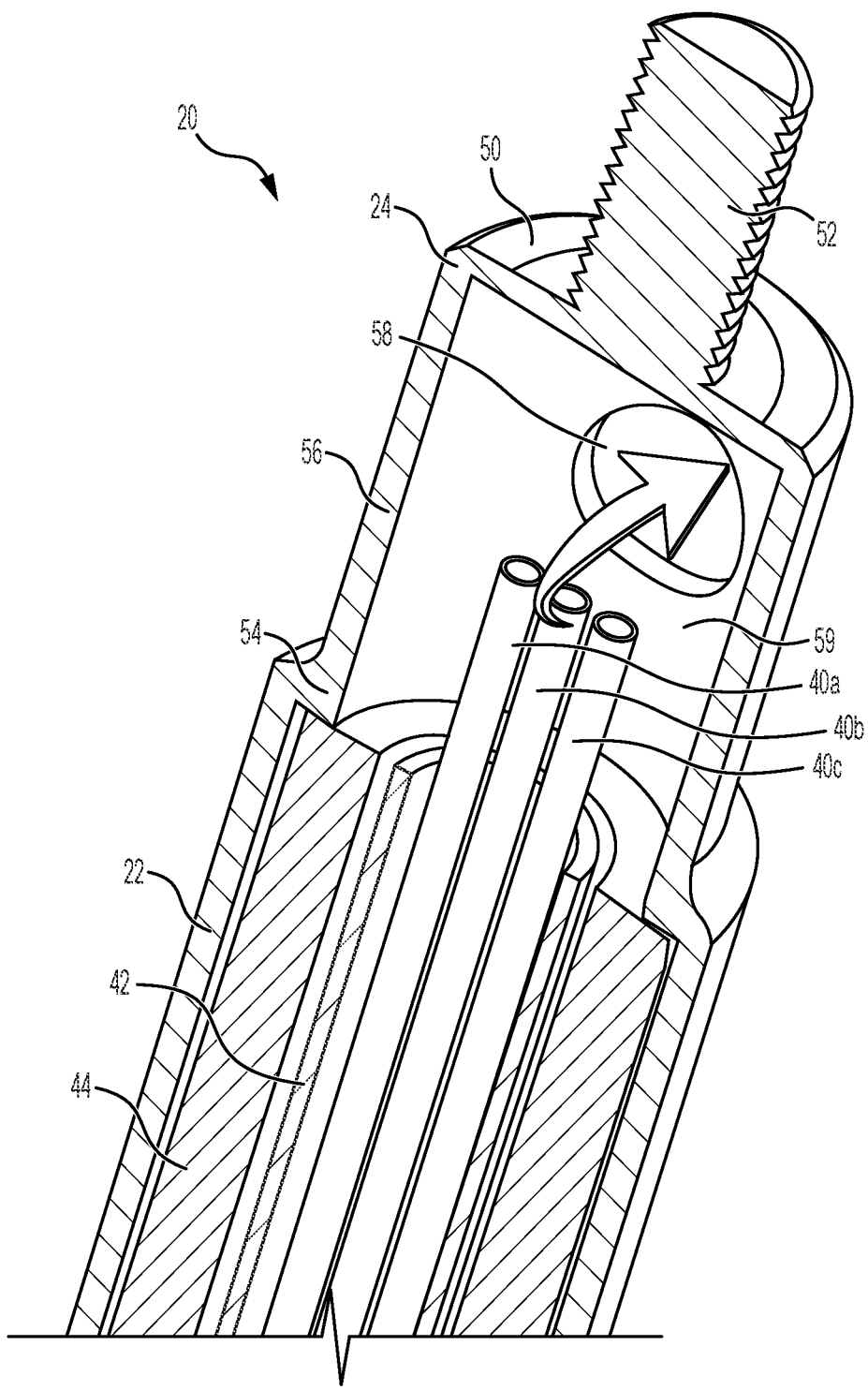
FIG. 3 shows a perspective cut-away view showing a section of the first shifter lever of FIG. 1 around an upper end thereof.

FIG. 3 shows a perspective cut-away view showing a section of the first shifter lever 20, including the upper end 24. As shown in FIG. 3, the first shifter lever 20 includes a closed surface 50 including perpendicular to the length of the shifter tube 22 at the upper end 24. The first shifter lever 20 also includes a handle mount 52, 56 located at the upper end 24 of the shifter tube 22 for attaching a handle (not shown in the FIGS.) for an operator to actuate the operation of the vehicle transmission. The handle mount 52, 56 includes a threaded rod 52 protruding from the closed surface 50 and away from the lower end 26 of the shifter tube 22.

FIG. 3 also shows the first shifter lever 20 including a shoulder 54 adjacent to and spaced apart from the upper end 24. A cap portion 56 having a tubular shape extends from the shoulder 54 to the upper end 24 and has a smaller diameter than the shifter tube 22 below the shoulder 54. The cap portion 56 may function as a part of the handle mount 52, 56 for receiving the handle thereabout. The cap portion 56 may define an internal space 59 for routing the air lines 40a, 40b, 40c. The cap portion 56 defines an upper aperture 58 through a side thereof, adjacent to the to the upper end 24 for the air lines 40a, 40b, 40c to exit for connection to a control valve, which may be integrated with the handle.

FIG. 4A shows a side view of a second shifter lever 120, which may be similar or identical to the first shifter lever 20, except with two bends 28 to form a dog-leg arrangement. The two bends may each define an angle of 25-degrees, and portions of the shifter tube 22 adjacent to each of the ends thereof may be mutually parallel. The second shifter lever 120 may define an overall length of about 38.5 inches. FIG. 4B shows a partially-transparent perspective view showing a section of the second shifter lever 120. As shown on FIG. 4B, a bushing 60 is disposed in the base portion 32. The bushing 60 has a tubular shape and defines a central bore 62 that extends coaxially with the shifter tube 22 and is configured to receive a shift linkage (not shown) for operably connecting the second shifter lever 120 to a transmission. The bushing 60 defines a retaining bore 134 that extends per perpendicular to the central bore 62 and which is aligned with the mounting hole 34 in the shifter tube 22. The central bore 62 is configured to receive a pin for securing the second shifter lever 120 to the shift linkage.

Figures 5A, 5B:
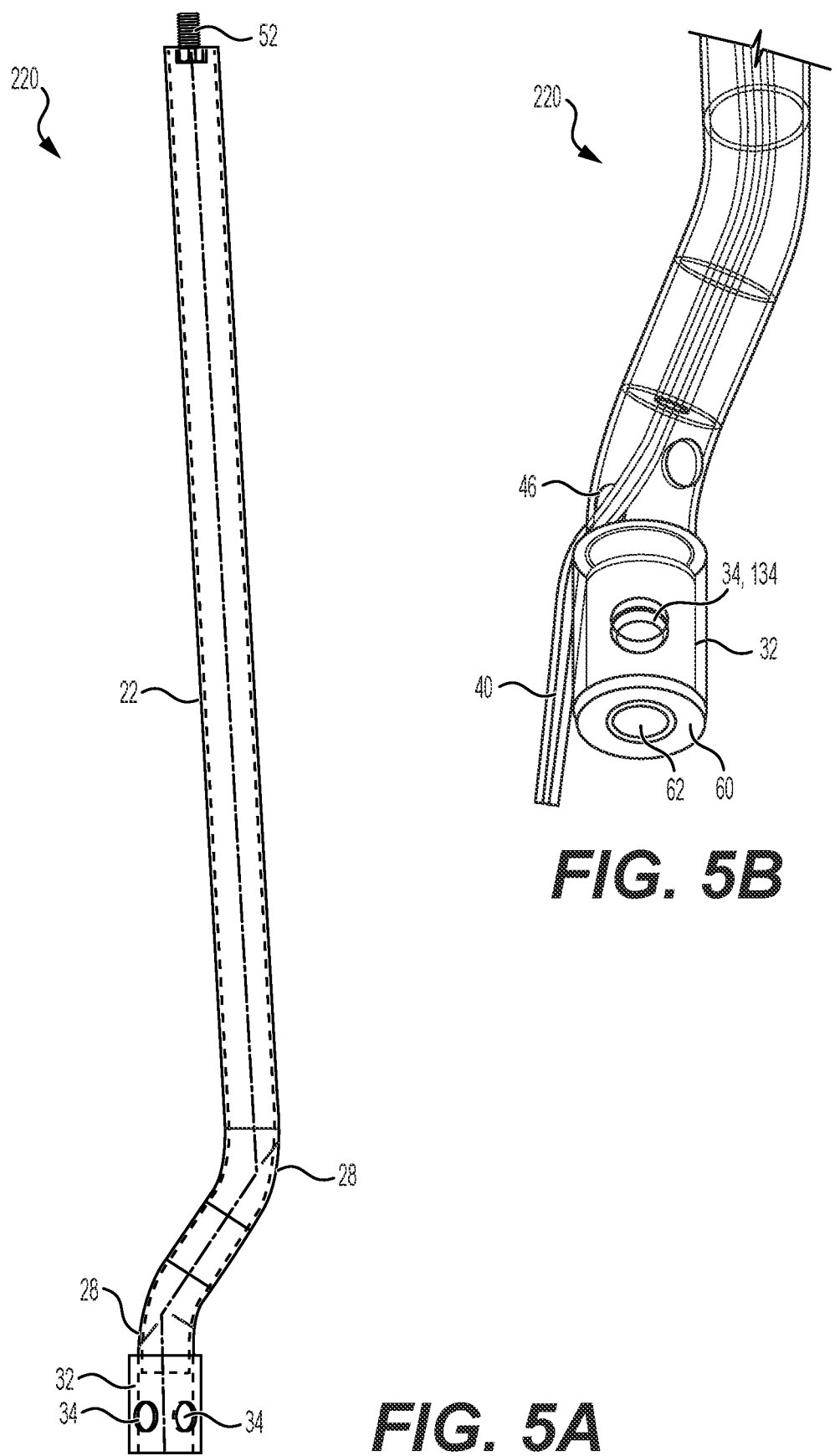
FIG. 5A shows a side view of a third shifter lever of the present disclosure.
FIG. 5B shows a partially-transparent perspective view showing a section of the third shifter lever of FIG. 5A around a lower end thereof.

FIGS. 5A-5B show a third shifter lever 220 of the present disclosure. The third shifter lever 220 may be similar or identical to the second shifter lever 120, except with the two bends 28 in close proximity and each located close to the base portion 32. The third shifter lever 220 may define an overall length of about 40 inches. The two bends 28 of the third shifter lever 220 may have similar or identical angular measurements. For example, the two bends 28 may have angular measurements of 37.0-degrees and 33.7-degrees, respectively.

The foregoing description is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A shifter lever for a vehicle transmission, comprising:
    a shifter tube extending between an upper end and a lower end, the shifter tube including a base portion having a tubular shape with a cross-section that is wider than a cross-section of a main part of the shifter tube between the base portion and the upper end,
    wherein the base portion is configured to receive an attachment member for coupling the shifter lever to the vehicle transmission for controlling an operation thereof, the shifter tube defining an upper aperture adjacent to the upper end; and
    a liner of foam material disposed in the shifter tube and along a substantially entire length thereof for reducing vibration in the shifter tube, wherein the liner defines a channel configured to receive at least one of an air line or an electrical cable therethrough,
    wherein the shifter tube and the liner together define a lower aperture adjacent to and spaced art from the base portion, the lower aperture configured to receive the at least one of the air line or the electrical cable therethrough.

2. The shifter lever of claim 1, wherein the liner is injected into the shifter tube and cured in place to conform to an interior surface of the shifter tube and to adhere to the interior surface of the shifter tube.

3. The shifter lever of claim 1, wherein the liner includes a foam rubber material.

4. The shifter lever of claim 1, further comprising an inner conduit tube extending through an interior of the liner and along the substantially entire length of the shifter tube, the inner conduit tube configured to receive the at least one of the air line or the electrical cable, and wherein the liner of foam material prevents the inner conduit tube from contacting an interior surface of the shifter tube.

5. The shifter lever of claim 1, further comprising a handle mount located at the upper end of the shifter tube for attaching a handle to actuate the operation of the vehicle transmission.

6. The shifter lever of claim 5, wherein the upper end of the shifter tube defines a closed surface extending perpendicular to the length of the shifter tube, and wherein the handle mount includes a threaded rod protruding from the closed surface and away from the lower end of the shifter tube.

7. The shifter lever of claim 1, wherein the attachment member includes a bushing having a tubular shape and defining a central bore extending coaxially with the shifter tube and configured to receive a shift linkage.

8. The shifter lever of claim 7, wherein the bushing further defines a retaining bore extending perpendicular to the central bore and configured to receive a pin for securing the shifter lever to the shift linkage.

9. The shifter lever of claim 1, wherein the shifter tube defines at least one bend between the upper end and the lower end.

10. The shifter lever of claim 9, wherein the at least one bend includes exactly one bend.

11. The shifter lever of claim 9, wherein the at least one bend includes two bends to form a dog-leg arrangement.

12. The shifter lever of claim 1, wherein the shifter tube further defines a shoulder located adjacent to and spaced apart from the upper end, with a cap portion extending from the shoulder and to the upper end, and wherein the cap portion has a tubular shape with a diameter that is smaller than a diameter of the shifter tube between the shoulder and the lower end.

13. The shifter lever of claim 12, wherein the cap portion defines the upper aperture.

14. A method of making a shifter lever for a vehicle transmission, comprising:
- providing a shifter tube extending between an upper end and a lower end, the shifter tube including a base portion having a tubular shape with a cross-section that is wider than a cross-section of a main part of the shifter tube between the base portion and the upper end, wherein the base portion is configured to receive an attachment member for coupling the shifter lever to the vehicle transmission for controlling an operation thereof,
- injecting a liquid material an interior of the shifter tube;
- curing the liquid material in place to form a liner of liner of foam material conforming and adhering to an interior surface of the shifter tube, wherein the shifter tube and the liner together define a lower aperture adjacent to and spaced apart from the base portion, the lower aperture configured to receive at least one of an air line or an electrical cable therethrough.

15. The method of claim 14, further comprising:
- inserting an inner conduit tube within the interior of the shifter tube to define an annular space therebetween and prior to the injecting the liquid material; and
- wherein the injecting the liquid material includes injecting the liquid material into the annular space between the inner conduit tube and the interior surface of the shifter tube, and
- wherein the curing the liquid material causes the liner to form a bond between the inner conduit tube and the interior surface of the shifter tube and to prevent the inner conduit tube from contacting an interior surface of the shifter tube.

* * * * *